United States Patent
Martinazzo

(10) Patent No.: US 7,348,374 B2
(45) Date of Patent: Mar. 25, 2008

(54) INDUCTION CURED POWDER COATINGS FOR TEMPERATURE SENSITIVE SUBSTRATES

(75) Inventor: Franco Martinazzo, Montebelluna (IT)

(73) Assignee: Rohm and Haas Company, Philadelphia, PA (US)

( * ) Notice: Subject to any disclaimer, the term of this patent is extended or adjusted under 35 U.S.C. 154(b) by 462 days.

(21) Appl. No.: 10/983,115

(22) Filed: Nov. 5, 2004

(65) Prior Publication Data

US 2005/0123743 A1 Jun. 9, 2005

(30) Foreign Application Priority Data

Dec. 5, 2003 (EP) ................... 03425781

(51) Int. Cl.
*C09D 5/00* (2006.01)
(52) U.S. Cl. ................ 524/431; 524/440; 427/522
(58) Field of Classification Search ........... 524/431, 524/440; 252/62.54; 430/106.2, 106.1
See application file for complete search history.

(56) References Cited

U.S. PATENT DOCUMENTS

| 4,244,985 A | | 1/1981 | Graff et al. | |
|---|---|---|---|---|
| 4,557,991 A | * | 12/1985 | Takagiwa et al. | ......... 430/108.8 |
| 5,294,682 A | * | 3/1994 | Fukuda et al. | ............... 525/442 |
| 5,635,548 A | * | 6/1997 | Kittle et al. | ................. 523/220 |
| 5,945,246 A | * | 8/1999 | Kawaji et al. | ......... 430/137.15 |
| 2005/0065294 A1 | * | 3/2005 | Cramer et al. | ............... 525/476 |

FOREIGN PATENT DOCUMENTS

| DE | 196 54 965 A1 | | 5/1998 |
|---|---|---|---|
| DE | 198 09 838 A1 | | 11/1998 |
| EP | 0359709 A2 | | 3/1990 |
| EP | 1 013 722 B1 | | 6/2000 |
| JP | 58-37063 | * | 3/1983 |
| WO | WO 97/36049 | | 10/1997 |
| WO | WO 02/090002 A2 | | 11/2002 |
| WO | WO 02/090448 A2 | | 11/2002 |
| WO | WO 2004/024836 A2 | | 3/2004 |

* cited by examiner

Primary Examiner—C. Melissa Koslow
(74) Attorney, Agent, or Firm—Andrew E. C. Merriam

(57) ABSTRACT

According to the present invention, powder coating compositions comprise one or more than one thermoplastic or thermosetting polymer or resin and one or more than one finely divided magnetic material, such as a ferromagnetic material. Preferred magnetic materials include $Ni_{1-x}Zn_xFe_2O_4$ compounds, wherein $0.4 \leq X \leq 0.75$, piezoelectric compounds, ferrimagnetic $\delta FeOOH$, Fe—Ni—B, $Cu_2MnIn$, transparent polymer-Cobalt oxide nanocomposites and soft ferrites. In addition, the present invention provides methods of making powder coatings on a substrate comprising applying to a substrate a resinous powder coating composition comprising one or more than one magnetic material to form a powder coating layer, followed by induction heating to melt the applied powder coating to form a coating film and, optionally, to cure the powder coating. The powder coatings remain at a pre-selected temperature equal to or less than the Curie temperature ($T_C$) of the one or more than one finely divided magnetic material during induction heating of the powder coating without directly heating the substrate. Powder coatings on metal parts may also be induction heat cured.

8 Claims, No Drawings

INDUCTION CURED POWDER COATINGS FOR TEMPERATURE SENSITIVE SUBSTRATES

The present invention relates to induction cured powder coatings, as well as to methods of induction curing powder coating and coated articles formed thereby. More specifically, the present invention relates to powder coatings having magnetic particles therein, to magnetic induction curing of powder coatings and to the coatings formed thereby.

BACKGROUND

Heretofore, compositions comprising ferromagnetic materials have provided conductive or inductive adhesives, films, and inks. However, these compositions have thus far comprised solvents and other volatile organic compounds (VOCs) which rapidly volatilize to dry the adhesive, film, or ink and which present health and environmental hazards.

More recently, liquid epoxy coatings comprising ferromagnetic materials and adhesive resins have been proposed. Such coatings may be cured through induction heating of the ferromagnetic materials. However, adhesive resin coating materials are very difficult to handle, as they tend to irreparably foul the equipment used to apply them unless they contain high amounts of VOCs. Further, these coatings are not free of hazardous VOC's, especially when formulated as low solids lacquers to reduce viscosity. Still further, the overspray from any liquid coatings can be reclaimed or recycled only at costs greater than the coating materials themselves.

WO-01/51568 A1, to UV Specialties, discloses ultraviolet light (UV) curable ferromagnetic compositions used in the screen printing of capacitors and inductors. The compositions contain conductive/magnetic powder, UV curing resins, such as acrylated oligomers, and less than 5 weight % of VOCs. However, the UV curable compositions provide only conductive screen printable coatings having a relatively high ferromagnetic material content. Further, such low VOC compositions are not tailored to meet the flexible weatherability, durability and chemical resistance needs provided in protective coatings for durable goods and for interior and exterior architectural use. Still further, such compositions do not provide satisfactory appearance properties for use in decorative coatings. Finally, the overspray from any liquid coating compositions can be reclaimed or recycled only at costs greater than the coating materials themselves.

In accordance with the present invention, the inventors have discovered coating compositions that are free of VOCs, that are fully recyclable, and which provide coatings having excellent functional and appearance properties when cured via magnetic induction.

STATEMENT OF THE INVENTION

The present invention provides powder coating compositions comprising one or more than one thermoplastic or thermosetting polymer or resin and one or more than one finely divided magnetic material, such as a ferromagnetic material. Magnetic materials may be selected so that the powder coatings containing them remain at a pre-selected temperature equal to or less than the Curie temperature ($T_C$) of the one or more than one finely divided magnetic material during induction heating to flow out or, if desired, to flow out and cure the coating, desirably from 50 to 250° C.

Preferred magnetic materials may be chosen from steel-Fe—Ni and Fe—Ni—B alloys, transparent polymer-Cobalt oxide nanocomposites, soft ferrites, piezoelectrics, $Ni_{1-x}Zn_xFe_2O_4$ compounds, wherein $0.4 \leq X \leq 0.75$, and mixtures thereof.

In another embodiment, the present invention provides methods of making thermoplastic or curable coatings on a substrate comprising applying to a substrate a powder coating composition comprising one or more than one thermoplastic or thermosetting polymer or resin and one or more than one magnetic material to form a powder coating layer, followed by induction heating the applied powder coating to melt it to form a coating film and, optionally, to cure the powder coating. The method allows controlled heating of coatings to effect film formation and cure and enables the coating of heat sensitive substrates, such as plastic, wood, paper, e.g. the on-mold coating of plastics, without directly heating the substrate. Nevertheless, induction heating of powder coating layers may be followed by UV, visible light, thermal curing, or any combination thereof to form a cured coating.

In yet another embodiment, the present invention provides methods of making powder coatings on metal substrates, such as steel and stainless steel beams, girders, pipes and parts for vehicles, comprising applying one or more powder coating layers to the substrates and then induction heating the surface of the substrates to heat and flow out or cure the one or more powder coating layers.

DETAILED DESCRIPTION

Magnetic materials have the ability to become magnetized when exposed to a magnetic field, such that the interaction between the ferromagnetic material in the coating and the dynamic magnetic field of, for example, an induction coil produces heat due to magnetic hysteresis. Induction heating works only on the ferromagnetic material contained in the coating and does not heat the substrate. To achieve heating of the powder coating, alternating magnetic fields having >50 KHz frequencies powered by an alternating current (AC) may be used, however alternating magnetic fields may also be generated via radio frequency (RF).

Uniform heating can be achieved, and overheating can be prevented, by proper selection of magnetic materials with a desired Curie temperature, i.e. the temperature at which the material becomes paramagnetic and no longer heats. Magnetic particles may preferably be selected so that exciting induction coils to generate hysteresis loss from the magnetic or ferromagnetic particles in the powder coating heats the coating to its melting temperature at from 1 to 150° C. below the Curie temperature of the Magnetic or ferromagnetic particles. In general, magnetic materials useful in the present invention will have Curie temperatures of from 90° C. to 275° C. One preferred material, $Ni_{1-x}Zn_xFe_2O_4$, has a $T_C$ that depends on its zinc content and can be varied as desired from 125° C. to 275° C., as shown in the following Table:

| Material | Curie Temperature ° C. |
|---|---|
| $Ni_{0.5}Zn_{0.5}Fe_2$ | 275 |
| $Ni_{0.43}Zn_{0.57}Fe_2$ | 220 |
| $Ni_{0.36}Zn_{0.64}Fe_2$ | 160 |
| $Ni_{0.28}Zn_{0.72}Fe_2$ | 125 |

Other suitable magnetic materials having desirable Curie temperatures ($T_C$) include $Cu_2MnIn$ ($T_C$ 227° C.), Jacobsite or ferrimagnetic $MnFe_2O_4$ ($T_C$ 300° C.), feroxyhyte or ferrimagnetic δFeOOH ($T_C$ 180° C.); and piezoelectrics, including ferromagnetic BaTiO$_3$ ($T_C$ 135° C.), tungsten bronze oxides, such as $(Sr_{0.3}Ba_{0.7})Nb_2O_6$ ($T_C$ 180° C.), $Ba_5SmTiZr_2Nb_7O_{30}$ ($T_C$ 78° C.), and bismuth layer-structured ferroelectrics, such as $BaBi_2Ta_2O_9$ ($T_C$ 200° C.) and $Bi_3TiTaO_9$ ($T_C$ 110° C.). Accordingly, the selection of particulate magnetic materials enables outstanding temperature control in forming powder coatings, so that temperature sensitive substrates such as wood or plastic can be coated without the surface of the substrate becoming hot or developing heat induced defects, such as warping of thin parts.

Herein, unless otherwise indicated, percentages are by weight. Further, unless otherwise indicated, the total amount of resins and other components in the powder compositions of the present invention are expressed as weight parts relative to 100 parts by weight of the resin (phr). Still further, unless otherwise indicated, all tests and measures are performed under conditions of standard temperature and pressure.

All limitations and ranges recited herein are inclusive and combinable. Thus, if resin A is said to be useful in an amount of 20 phr or more, for example, 40 phr or more, or 50 phr or more, and, separately, resin A is said to be useful in the amount of less than 90 phr, for example, less than 80 phr, then resin A may, alternatively be used in amounts of from 20 to 80 phr, from 20 to 90 phr, from 40 to 80 phr, from 40 to 90 phr, from 50 to 80 phr, from 50 to 90 phr, from 20 to 40 phr, from 20 to 50 phr, from 80 to 90 phr, or in amounts of from 40 to 50 phr.

As used herein, the phrase "acid number" refers to the number of mg KOH required to neutralize the alkali-reactive groups in 1 g of polymer and has the units (mg KOH/g polymer). The acid number is determined according to ASTM standard test method D 1639-90.

As used herein, unless otherwise indicated, the phrase "acrylic" means acrylic or methacrylic, and the phrase "acrylate" means acrylate or methacrylate, or any mixture or combination thereof.

As used herein, the phrase "average particle size or diameter", refers to particle diameter as determined by laser light scattering using a Malvern Instruments, Malvern, Pa., device located at the Rohm and Haas Powder Coatings Reading, PA Facility, Equipment Serial #: 34315-33.

As used herein, the "glass transition temperature" or Tg of any polymer may be calculated as described by Fox in *Bull. Amer. Physics. Soc.*, 1, 3, page 123 (1956). The Tg can also be measured experimentally using differential scanning calorimetry (rate of heating 20° C. per minute, Tg taken at the midpoint of the inflection). Unless otherwise indicated, the stated Tg as used herein refers to the calculated Tg.

As used herein, the term "hard" magnetic materials or "permanent" magnetic materials refers to any material that can be heated by induction and that has a long lasting remanence after exposure to a magnetizing force.

As used herein, the term "heating or curing" or "curing or heating" refers to induction heating one or more than one thermally or radiation curable polymer or resin in one or more than one layer to melt the polymer or resin and form a coating film and, optionally, to cure the coating, as well as to induction heating one or more than one thermoplastic polymer or resin in one or more than one layer to melt the polymer or resin to form a coating.

As used herein, the phrase "hydroxyl number" refers to the number of milligrams (mg) of KOH equivalent to the hydroxyl groups present in each gram (g) of polymer and has the units (mg KOH/g polymer).

As used herein, the phrase "magnetic" includes ferromagnetic, ferrimagnetic, (super)paramagnetic or piezoelectric materials which may be heated by alternating electric, magnetic, or electromagnetic fields.

As used herein, the phrase "(meth)acrylate" refers to either or both acrylate and methacrylate.

As used herein, unless otherwise indicated, the phrase "per hundred parts resin" or "phr" means the amount, by weight, of an ingredient per hundred weight parts of the total amount of resin or polymer contained in a coating powder, including cross-linking resins.

As used herein, unless otherwise indicated, the phrase "polymer" or "resin" includes, independently, monomers, oligomers, polymers, copolymers, terpolymers, block copolymers, segmented copolymers, prepolymers, graft copolymers, and any mixture or combination thereof.

As used herein, the term "soft" magnetic materials or "non-permanent" magnetic materials refers to any material that can be heated by induction but having a remanence that is substantially zero after exposure to a magnetic force.

As used herein, the phrase "wt. %" stands for weight percent.

In an embodiment of the invention, low temperature curing powder coating compositions may comprise one or more thermoplastic or thermosetting polymer or resin and one or more particulate magnetic materials are known that have Curie temperatures of 180° C. or less, such as $Ni_{0.36}Zn_{0.64}Fe_2$, and BaTiO$_3$, $(Sr_{0.3}Ba_{0.7})Nb_2O_6$. Further, powder coating compositions may comprise one or more thermoplastic or thermosetting polymer or resin and one or more particulate magnetic materials are known that have Curie temperatures of 130° C., such as $Ni_{0.28}Zn_{0.72}Fe_2$, $Ba_5SmTiZr_2Nb_7O_{30}$ and $Bi_3TiTaO_9$. The temperatures of such coatings will not rise above the Curie temperature in induction heating, and the substrate itself is not heated except to the extent that the heated coating itself changes substrate temperature.

In another embodiment of the invention, coated plastics, paper, wood or engineered wood may be formed by applying the magnetic powder coatings to the substrate to form a powder coating layer, and induction heating the coating layer to a temperature at or below the Curie temperature of the magnetic or ferromagnetic materials in the powder coating. The method is especially useful for coating "heat sensitive substrates", such as hardwood, lumber, plywood, medium density fiberboard (MDF), paper, thermoplastic polyolefin (TPO), sheet molded composites (SMC), acrylonitrile-butadiene-styrene (ABS), high density polyethylene (HDPE), polyethylene terephthalate (PET) substrates, e.g. beverage bottles, as well as molded plastics, such as molded polyesters, polyamides and polyolefins, and other heat sensitive substrates.

In yet another embodiment, powder coatings according to the present invention may be applied via "on mold" coating methods. A preferred on-mold coating powder useful in this invention comprises one or more particulate blend of a) an unsaturated polyester comprising "active hydrogens" together with b) one or more radical polymerizable crosslinker, polymer or prepolymer, c) one or more thermal initiator, e.g., peroxy ketal, d) one or more redox catalyst, e.g., cobalt salt, and e) one or more mold release agent. Methods for on-mold coating the outer surface of molded articles comprises providing one or more than one low temperature cure coating powder composition comprising one or more than one finely divided magnetic material, applying the coating powder, onto a mold surface, preferably while the mold surface is sufficiently hot to cause the powder particles to melt and flow and spread out over the mold surface and form a substantially continuous film at least along the mold interface, induction heating the powder coated mold surface to soften and flow any solid powder particles and cause the resulting coating film to coalesce, applying one or more compatible liquid thermosetting molding resin, with or without fiber or filler reinforcement, which constitutes the bulk of the article, onto the coating powder film, allowing the cure of the fill resin to advance sufficiently until the powder coating and fill resin are integrally cured, and removing the molded article from the mold as the finished coated article. In the aforesaid method, the coating powder application and curing steps are preferably carried out in an open air environment, i.e., while the mold is opened and exposed to ambient conditions.

In yet still another embodiment of the invention, methods of forming a powder coating comprise applying a thermoplastic or heat cured powder coating which does not comprise a finely divided magnetic material onto metal substrates, such as heavy mass parts, and induction heating the substrate to flow out and cure the powder coating.

In yet even still another embodiment of the invention, coated substrates may have thereon single coating layers or multilayer coatings, such as a basecoat layer, a colorcoat layer and a clearcoat layer wherein the magnetic powder coating comprises each of the one or more layers of the coating.

"Suitable powder coating compositions may comprise one or more than one polymer or resin having a Tg of at least 35° C., or 40° C. or more, or 45° C. or more, for example, suitable epoxy resin Tgs range from 40 to 55° C. and suitable polyester resin Tgs range from 50 to 65° C. Such resins may include any thermally and cationically cured, e.g. via heat, infrared (IR) or near infrared (NIR) cure, such as those chosen from epoxy resins, polyesters, urethanes, acrylics, silicones and vinyl ether resins, as well as radical polymerizable polymers and resins, e.g. acrylic or unsaturated polyester, that may be cured thermally or via microwave and electron beam radiation, or via visible light or ultraviolet (UV) light, as well as mixtures, hybrids and combinations thereof. In addition, powder coating compositions may be chosen from thermoplastic polyamides, polyolefins, polyvinylidene fluoride (PVDF) resins, polyvinyl chloride, polyvinyl acetate, vinyl chloride-vinyl acetate copolymers, polyacetals, ethylene-vinyl acetate copolymers, polystyrenes, polyacrylates, ketone resins, coumarone-indene resins, terpene resins and polyvinyl butyrals, as well as mixtures, hybrids and combinations thereof."

Induction heating functions to flow out or gel coatings and, if desired, cure them. Thermoplastic and UV curing powder coatings may be fused and flowed out to form coatings in the absence of any curing agent or catalyst. In addition, in the case of UV curing coatings, full cure may be achieved by UV cure after flow out. All suitable resins can be melted or flowed by induction heating to form a coating film. For example, all suitable radiation curable, light curable and cationic and thermally cured resins and polymers can also be cured by induction heating in the presence of appropriate catalyst.

In some high temperature thermal curing applications, e.g. multilayer coatings, a thermal treatment may follow induction heating to insure through cure, i.e. via IR or convection heating.

Suitable epoxy resins may include, for example, aliphatic or aromatic epoxy resins, including the reaction products of halohydrins and aliphatic glycols, diphenols or polyphenols, such as at least one of the foregoing types of epoxides, such as bisphenol A, bisphenol F, bisphenol S, and the like. Epoxy resins may be induction heat cured and may be cationically cured in the presence of a cationic initiator and heat of induction, even in the absence of a catalyst, i.e. a Lewis acid or base.

Exemplary epoxy resins may include bisphenol A epoxy resins and polyphenylether diol epoxy resins. Such resins may be have a melt viscosity of from 300 to 4000 centipoises at 150° C. and may have an epoxide equivalent weight (eew) of from 300 to 1500.

One and two component epoxy systems may be used, including low temperature thermal curing systems that cure at from 100° C. to 150° C. and which find advantageous use on paper, plastic, cardboard, wood and heat sensitive substrates. Thermally labile epoxy curing agents may include amines, phenolics, imidazoles, cyclic amidines, dicyandiamides, carboxylic acids and anhydrides, as well as storage stable low temperature curing epoxy amine, epoxy imidazole, epoxy acid/anhydride, or epoxy amidine adducts, for example, epoxy adducts of primary or secondary aliphatic polyamines which are solid at 27° C. A two component epoxy system may comprise 1 to 8 phr of imidazole, cyclic amidines and epoxy adducts thereof mixed with the epoxy resins and, separately, 2 to 40 phr of epoxy adducts of aliphatic polyamines as curing agents. A one component epoxy system may comprise epoxy resin mixed with 2 to 40 phr of epoxy adducts of aliphatic polyamines, carboxylic acids or anhydrides, or with 1 to 8 phr of epoxy imidazole adducts as curing agents.

Suitable polyesters may comprise carboxylic acid functional or hydroxyl functional polyesters, the weight average molecular weight (Mw) of which ranges from 1,000 to 40,000, for example, from 2,000 to 7,000, or from 2,500 to 5,000. Polyesters may have an acid number of from 1 to 80, for example 30-80, or a hydroxyl number of from 5 to 100, for example 20 to 80, and may comprise both acid and hydroxyl functions.

Polyesters may be formed in conventional manner from carboxylic acids (or their anhydrides) having acid functionalities of 2 or greater and polyols having hydroxyl functionality of 2 or greater. Examples of suitable multi-functional carboxylic acids include benzene-1,2,4-tricarboxylic acid, phthalic acid, tetrahydrophthalic acid, hexahydrophthalic acid, endobicyclo-2,2,1-5-heptyne-2,3-dicarboxylic acid, tetrachlorophthalic acid, cyclohexanedioic acid, isophthalic acid, terephthalic acid, trimesic acid, 3,6-dichlorophthalic acid, tetrachlorophthalic acid, benzophenone dicarboxylic acid, diphenic acid, 4,4-dicarboxydiphenyl ether, 2,5-pyridine dicarboxylic acid, trimellitic acid, pyromellitic anhydride, azelaic acid, maleic acid, succinic acid, adipic acid, sebacic acid, glutaric acid, pimelic acid, suberic acid, azelaic acid, diglycolic acid, 1,12-dodecanoic acid, tetrapropenyl succinic acid, maleic acid, fumaric acid, itaconic acid, malic acid, their anhydrides, and like carboxylic acids. Examples of suitable multi-functional alcohols include glycerin, trimethylolpropane, trimethylolethane, tris-hydroxyethylisocyanurate, pentaerythritol, ethylene glycol, diethylene glycol, propylene glycol, trimethylene glycol, neopentyl glycol, 1,3-, 1,2- and 1,4-butanediols, heptanediol, hexanediol, octanediol, 2,2'-bis(4-cyclohexanol)propane, neopentyl glycol, 2,2,3-trimethylpentane-1,3-diol, 1,4-dimethylolcyclohexane, 2,2,4-trimethylpentane diol, 2-n-butyl-2-ethyl-1,3-propanediol, etc. To obtain carboxyl-functional polyesters of desired molecular weight, the monomer mixture used to form the polyester has an appropriate excess of carboxyl functionality to hydroxyl functionality. To obtain hydroxyl-functional polyesters of desired molecular weight, the monomer mixture used to form the polyester has an appropriate excess of hydroxyl functionality to carboxyl functionality.

Suitable polyester resins for weatherable applications, e.g. coatings for outdoor use such as extruded aluminum window frames, may comprise the polymerization reaction product of dicarboxylic acids, glycols and monomers of functionality of three or higher, such that the dicarboxylic acids comprise at least 75 mole % of isophthalic acid and at least 5 mole % of 1,4-cyclohexane dicarboxylic acid, for example, from 75 to 90 mole % of isophthalic acid and from 10 to 25 mole % of 1,4-cyclohexane dicarboxylic acid.

Suitable unsaturated polyesters resin for on-mold coatings may be cured via a combination of induction heat and UV in the presence of a UV initiator, or may be induction heat cured in the presence of a radical initiator. Such polyesters may comprise one or more unsaturated polyester resin containing active hydrogen atoms obtained by the condensation of ethylenically unsaturated dicarboxylic acids (or anhydrides), e.g., maleic anhydride or fumaric acid, and one or more diol or polyol possessing active hydrogen atoms, e.g., 1,4-cyclohexane dimethanol, to reduce air inhibition of cure at the exposed surface and improve flow out behavior at low temperatures, along with minor amounts of aromatic dicarboxylic acid (or anhydride) and aromatic diols, e.g., combinations of phthalic anhydride and hydrogenated bisphenol A, respectively, to raise the Tg of the resin to 40° C. or higher. The term "active hydrogen" used herein means a hydrogen atom that is readily abstracted by free radicals and participates in the curing reaction. Examples of suitable diols or polyols possessing active hydrogens include alcohols having: one or more allylic hydrogen, such as trimethylol propane monoallyl ether, trimethyol propane diallyl ether, vinyl cyclohexanediol, etc.; one or more benzylic hydrogen, such as benzene dimethanol, etc.; one or more tertiary alkyl hydrogen, such as methyl propanediol, butylethyl propanediol, etc.; and, one or more cyclohexyl hydrogen, such as cyclohexane dimethanol, cyclohexane diol, etc. It is also possible to supply the active hydrogen through the carboxylic acid. Examples of suitable di- or polyfunctional carboxylic acids with active hydrogens include carboxylic acids having: one or more malonyl hydrogen, such as malonic acid, etc.; one or more allylic hydrogen, such as nadic anhydride, tetrahydrophthalic anhydride, dimer acid, etc. From 10 and 100 mole %, and, preferably, from 50 and 100 mole %, of the hydroxyl functionality relative to the total hydroxyl functionality of monomers used to form the unsaturated polyester resin is supplied by active hydrogen containing polyol monomers, the balance being non-active hydrogen containing polyols.

Polyesters, including unsaturated polyesters, containing free carboxylic acid groups may be heat cured by condensation and may be mixed with from 2 to 40 phr, for example, from 3 to 20 phr, of curing agents, such as β-hydroxyalkylamides, epoxy resins, hydroxyl functional acrylic resins, aliphatic oxirane compounds, such as oxetanes, or triglycidyl isocyanurates (TGIC). Polyesters, including unsaturated polyesters, containing any free hydroxyl groups may be heat cured by condensation and may be mixed with from 2 to 40 phr, for example, from 3 to 20 phr, of curing agents, such as acid functional acrylic resins, carboxylic acids and anhydrides, blocked isocyanates and uretdiones, aminoplasts, e.g. melamines, and tetramethoxymethyl glycoluril. Polyesters containing free carboxylic acid and hydroxyl groups may be cured by a combination of curing agents.

Suitable urethane resins include two component polyol and polyisocyanate formulations, such as polyether polyols or hydroxyl functional urethanes as component one and isocyanate functional reaction products of isocyanates and polyols as component two. Suitable polyols include $C_2$-$C_8$ aliphatic glycols like ethylene and butylene glycol and polyethers thereof. Suitable isocyanates include hexamethylene diisocyanate, isophorone diisocyanate, xylylene diisocyanate, toluene diisocyanate, and the biurets and trimers thereof.

Suitable thermoset acrylic resins may comprise the reaction product of from 0.1 to 10 weight % of carboxylic acid or hydroxyl functional comonomers or both, based on the weight of all monomers used to form the resin, and may comprise the reaction product of up to 10% by weight of other comonomers, based on the weight of all monomers used to form the resin. Further, glycidyl(meth)acrylates may comprise 0.1 or more wt. %, for example, 1 wt. % or more, or 5 wt. % or more, or 10 wt. % or more, or 20 wt. % or more of glycidyl functional comonomers, based on the weight of all monomers used to form the resin, and may comprise the reaction product of 70 wt. % or less, for example, 55 wt. % or less, or 40 wt. % or less of glycidyl functional comonomers. The remainder of the monomers used to the acrylic resins of the present invention may comprise alkyl(meth) acrylates. Exemplary alkyl (meth)acrylates may include 1 to 8 carbon alkyl esters of acrylic and methacrylic acid, such as methyl acrylate, methyl methacrylate, ethyl acrylate, acrylic acid, methacrylic acid, butyl acrylate, butyl methacrylate, etc. Styrene or alpha-methyl styrene comonomers may also be incorporated, particularly to increase glass transition temperature of the acrylic copolymer. One suitable glycidyl functional acrylic copolymer (GMA) comprises a random copolymer of methyl methacrylate, glycidyl acrylate, and styrene having a glycidyl equivalent weight of from 290 to 310. GMA polymers and epoxy resins form useful chemical resistant and flexible hybrid coatings.

As for curing agents, carboxylic acid functional acrylic resins may be cured with epoxy resins, hydroxyl-functional acrylic resins may be cured with blocked isocyanates and uretdiones, aminoplasts, e.g. melamines, tetramethoxymethyl glycoluril, or acid anhydrides, and epoxy-functional acrylic resins may be cured with dicarboxylic acids, polyesters and polyanhydrides. Curing agents and acrylic resins should be mixed in stoichiometries of 0.7:1.0 to 1.4:1.0 of the curing agent functionality to the reactive acrylic functionality.

Suitable condensation cured silicone resins may have a viscosity of between about 500 and about 10,000 cps at 150° C., preferably 2000 to 5000 cps. Suitable organosilicone resins comprise organic groups, such as monovalent hydrocarbons, and hydrolyzable substituents, including silanol groups, hydroxyl groups, alkoxy groups and (alkyl)aryloxy groups, as well as siloxanes or silsesquioxanes substituted with monovalent hydrocarbons, hydroxyl groups, alkoxy groups and (alkyl)aryloxy groups. Hydrolyzable groups, such as a silanol functionality (Si—O—H), may comprise a content of 0.25 wt. % or more, for example, 0.5 wt. or more, or 1 wt. % or more, or 1.3 wt. % or more, or 2.5 wt. % or more, or 3 wt. % or more, based on the total weight of the silicone resin, and may range as high as 7 wt. %, or as high as 5 wt. %, based on the total weight of the silicone resin.

Examples of monovalent hydrocarbons include phenyl, methyl, $C_2$ through $C_{24}$ alkyl or (alkyl)aryl, and mixtures thereof.

Silicone resins useful in the present invention include heat resistant compounds of formula (1):

$$R_xR_ySiO_{(4-x-y)/2} \qquad (1)$$

wherein each of $R_x$ and $R_y$ is independently a monovalent hydrocarbon group, another group of formula (I), or $OR^1$, wherein $R^1$ is H or an alkyl or an aryl group having 1 to 24 carbon atoms, and wherein each of x and y is a positive number such that $0.8 \leq (x+y) \leq 4.0$. Exemplary silicone resin compositions may include organo-siloxanes comprising units including dimethyl, diphenyl, methylphenyl, phenylpropyl and their mixtures, for example, a mixture of methyl and phenyl groups, e.g. poly(methylphenylsiloxane), wherein the ratio of phenyl to methyl groups is 0.5 to 1.5:1, more preferably 0.7:1 to 1.1:1. Silicone resin containing powder coatings may require cure temperatures of from 150 to 232° C., any of which can be obtained through induction heating.

It may be desirable to substantially remove residual organic solvent from a silicone resin. The silicone resin of the present invention should contain 0.2 wt. % or less of organic solvents, preferably 0.1 wt. % or less. This may be accomplished by flaking, i.e. melting the silicone resin and removing solvent from the molten resin, e.g., by sparging with a gas, such as nitrogen, or by vacuum.

Silicone resins provide heat resistant powder coatings and may be combined in the amount of 40 to 90 phr with 10 to 60 phr of polyesters, epoxy resins, such as GMA, or their mixtures to enhance the adhesion of the coating to the substrate.

Suitable vinyl ether resins may be induction heat cured in the presence of a cationic initiator and generally comprise the following formula (2)

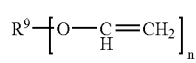

Formula (2)

wherein $R^9$ is selected from the group consisting of aromatic, aliphatic, alicyclic hydrocarbons, ethers, polyethers, esters, polyesters, urethanes, polyurethanes, and combinations comprising at least one of the foregoing hydrocarbons and/or polymers; and n=1-4. Vinyl ethers, like epoxy resins, may be cationically cured and may be combined with epoxy resins to make chemically resistant coatings.

Suitable radical polymerizable and ultraviolet (UV) or visible light cured polymers or resins may include acrylate terminated polyester, unsaturated polyester resins, aromatic urethane diacrylates, aliphatic urethane diacrylates, polyester tetra-acrylates, epoxy acrylates, such as bisphenol-A epoxy diacrylate, blends of acrylourethane resins and unsaturated polyester resins, combinations comprising acrylourethane resins and/or unsaturated polyester resins, and the like. Acrylourethane resins may comprise acrylic terminated urethanes or urethane prepolymers. All of these resins may be induction cured in the presence of radical initiators.

Suitable unsaturated polyester resins may have a degree of unsaturation between 2 and 20 weight percent (wt. %). Unsaturated polyesters may be formed in a conventional manner from di- or polyfunctional carboxylic acids (or their anhydrides) and di- or polyhydric alcohols, e.g. glycols such as neopentyl glycol and dipropylene glycol. The unsaturation is typically supplied by the carboxylic acid, although it is possible to supply it through the alcohol. Monohydric alcohols or monofunctional carboxylic acids, such as (meth) acrylic acids or their esters, may be employed for chain termination purposes. Suitable ethylenically unsaturated di- or polyfunctional carboxylic acids (or their anhydrides) include, for example, maleic anhydride, fumaric acid, or their mixtures. Aromatic and saturated acids, such as those used to make condensation curing polyesters may also be employed in conjunction with the unsaturated acids to reduce the density of the ethylenic unsaturation and provide the desired chemical and mechanical properties. Coatings made with unsaturated polyesters may be cured with from 2 to 40 phr, for example from 4 to 25 phr or from 10 to 20 phr of one or more vinyl ether resins, acrylourethanes or acrylated polyesters.

Powder coatings may comprise crosslinking polymers, prepolymers or resins that are cured via induction heat in the presence of radical or cationic initiators, such as acrylourethane resins, i.e. urethane resins having acrylic and urethane functionality, for example, the reaction product of polyisocyanate or polyisocyanate polyols with hydroxyalkyl (meth) acrylates, or vinyl ether resins, such as a divinyl ether or di(meth)acrylate terminated polymer, e.g. acrylated polyesters or polyurethanes, or divinyl ether urethanes, such as those obtained by the reaction of hydroxybutyl vinyl ether either with diisocyanates, isocyanate-terminated alcohol adducts, or isocyanurates.

Powder coating compositions further comprise finely divided ferromagnetic, ferrimagnetic, paramagnetic, superparamagnetic or piezoelectric materials which may be heated by alternating electric, magnetic, or electromagnetic fields so that the polymer or resin in the powder coating is heated above its softening point or melting point, and, optionally, above its curing temperature.

Suitable magnetic materials include those that are commercially available in several size ranges (nano to micro), chemical compositions and colors (even transparent). Suitable magnetic materials may have magnetizing forces of 0.1 Oe (Oersted) or more for piezoelectric magnetic materials, such as 50 Oe or more, and may range up to 1500 Oe, for example, up to 500 Oe.

Examples of finely divided magnetic materials include ferromagnetic metals, e.g., Fe, Co and Ni, or ferromagnetic alloys (alloys of the above described metal), Ni—Fe alloy, steel-Fe—Ni alloy, steel; $\gamma Fe_2O_3$, $Fe_3O_4$; transparent polymer-Cobalt oxide nanocomposites; ferromagnetic compounds, such as, $Ni_{1-x}Zn_xFe_2O_4$, $MnO$—$Fe_2O_3$, Ni—Zn—$Fe_2O_3$ and other Ni—Zn alloys having a $T_C$ of less than 250° C.; densified and heat treated ferromagnetic compounds, e.g. containing strontium, iron, oxygen, like $SrFe_{12}O_{19}$, or cobalt, barium, iron, oxygen, like $CO_2Ba_2Fe_{12}O_{22}$, and other vitrified compounds from ferromagnetic metals; multilayer particles, such as iron oxide Co-coated iron oxide powder; ferrimagnetic compounds, such as Jacobsite or ferrimagnetic $MnFe_2O_4$, feroxyhyte or ferrimagnetic $\delta FeOOH$, and $Cu_2MnIn$; soft ferrites such as Barium ferrite, Co, Ti, Nb-substituted Ba-ferrite; hexagonal ferrite particles comprising SrF, $M^{2+}2A$, $M^{2+}2D$ or $M^{2+}2Z$, where 2A is $BaO:2M^{2+}O:8Fe_2O_3$, 2D is $2(BaO:M^{2+}O:Fe_2O_3)$, 2Z is $3BaO:2M^{2+}O:12Fe_2O_3$, and $M^{2+}$ is divalent cation; magnetically soft ferrite particles having composition 1TO: $1Fe_2O_3$ and TO is transition metal oxide; hard ferrites, such as hematite powder, 8 to 400 nm ferrosoferric oxide $Fe_2O_3$ FeO or magnetite; paramagnetic Ni-rich austenite; and piezoelectric compounds such as $BaTiO_3$—$SrTiO_3$ Ferroelectrics, $BaTiO_3$, tungsten bronze oxides, such as $(Sr_{0.3}Ba_{0.7})Nb_2O_6$, $Ba_5SmTiZr_2Nb_7O_{30}$, and bismuth layer-structured ferroelectrics (BLSF), such as $BaBi_2Ta_2O_9$, and $Bi_3TiTaO_9$. Soft ferrites and piezoelectric compounds are soft magnets and may be used to form coatings that are non-conductive. Preferred particles include steel-Fe—Ni and Fe—Ni—B, transparent polymer-Cobalt oxide nanocomposites, soft ferrites, $Cu_2MnIn$, Jacobsite, ferrimagnetic $MnFe_2O_4$, feroxyhyte or ferrimagnetic $\delta FeOOH$, piezoelectric compounds and $Ni_{1-x}Zn_xFe_2O_4$ compounds. For example, the one or more than one finely divided magnetic material may be chosen from $Ni_{1-x}Zn_xFe_2O_4$ compounds, wherein $0.4<X<0.75$, ferrimagnetic $\delta FeOOH$, $Cu_2MnIn$, piezoelectric compounds, soft ferrites, Fe—Ni—B, transparent polymer-Cobalt oxide nanocomposites, and mixture thereof.

Magnetic materials may range in average particle size from as small as 5 nanometers (nm) or more, or 15 nm or more, or 50 nm or more, or 100 nm or more, to as much as 25 μm in average particle size, or up to 10 μm, up to 5 μm, or up to 1 μm. Magnetic materials may be of any shape, such as spherical, rod like, polygonal or amorphous, however, disk-like flakes are preferred. Coatings that contain homogeneously dispersed particles may heat more evenly and efficiently and smaller particles tend to disperse more evenly in coatings than larger particles. Accordingly, Preferred particle sizes are below 5 μm, more preferably below 1 μm. Particle size is limited by coating thickness and should not be so large as to interfere with coating film formation and continuity. Coating films may be desirably be textured and may thus desirably include larger particles.

The amount of finely divided magnetic material may be as low as 0.1 phr or more, or 0.5 phr or more, or 1.0 phr or more, and may range as high as 60 phr or less, or 40 phr or less, or 30 phr or less, or 10 phr or less, preferably from 2.0 to 30 phr. Lower amounts of smaller particles may be used. In addition, lower amounts of particles having a low oil absorption may be used. Oil absorption is defined by the amount of oil required by a given weight of a particulate material to form a paste of specified consistency and is measured according to ISO 787-5:1980, using linseed oil. Suitable magnetic particles have an oil absorption of 70 ml oil/100 g material or less, or 50 ml/100 g or less, or 35 ml/100 g or less, or 25 ml/100 g or less, most preferably 20 ml/100 g or less.

Very rapid induction heating can be affected if conductive iron or magnetized stainless steel particles having a particle size of from 1 to 75 μm are included in powder coatings. The weight ratio of the conductive particles to magnetic particles in the powder coatings should range from 0.6:1 to 6:1.

If desired, UV and photo-initiators may be used to cure coating films via visible or UV radiation following induction heating of the powder coating layer to a temperature of from 40 to 110° C. In this method, very low processing temperatures are achieved via UV or visible radiation cure and induction heating is used to flow out a powder coating layer to form a film. Suitable free radical photoinitiators include, for example, alpha cleavage photoinitiators, for example, benzoin, benzyl dimethyl ketal, acyl phosphines, such as diphenyl(2,4,6-trimethyl benzoyl) phosphine oxide, aryl ketones, such as 1-hydroxy cyclohexyl phenyl ketone, or 2-hydroxy ethoxyphenyl 2-hydroxy 2-methylpropane-1-one and dimethoxy phenyl acetophenone.

Radical polymerizable powder coatings desirably include free-radical initiators, such as organic peroxide and azo compounds, for example, peroxides, such as peroxy ketals, peroxy esters and peroxy carbonates, such as 1,1-bis(t-butylperoxy)-3,3,5-trimethylcyclohexane, diacyl peroxides, such as benzoyl peroxide, peroxy esters, dialkylperoxides, and ketone peroxides. The inclusion of thermal free-radical initiators has been found to assist in curing near the substrate, particularly when pigmented, opaque, or thick film coatings are desired.

Powder coatings having cationically polymerizable or curing resins or polymers desirably include cationic initiators. Suitable cationic initiators may include diaryliodonium salts, triaryliodonium salts, triarylsulfonium salts, copper synergists, and the like. An example of a cationic initiator useful in the present invention includes CD-1012, a diphenyl iodonium ($SbF_6$) salt, from Sartomer, and ethyl triphenyl iodonium bromide (ETPPI).

Effective total amounts of cationic initiator and free radical initiator may be greater than or equal to 0.1 phr, 0.5 phr or more, and 1 phr or more, and less than or equal to 10 phr, or 7.5 phr or less, 3 phr or less.

Thermal catalysts may optionally be employed to increase the cross-linking rate of the base resin, including, for example, transition metal compounds based on a fatty acid or oil, or tertiary amines, e.g. cobalt soaps, such as cobalt octoate, cobalt neodecanoate, cobalt naphthenate, cobalt octadecanoate, and magnesium salts. The amount of catalyst may be 1 part per hundred resin (phr) or less, or 0.75 phr or less, or 0.5 phr or less, and may be greater than or equal to 0.01 phr, or 0.05 phr or more, 0.1 phr or more.

Powder coating compositions may additionally comprise components such as catalysts, pigments, fillers, flow control agents, such as 2-hydroxy-1,2-diphenylethanone crystalline solid or acrylic oligomers, dry flow additives, anticratering agents, surfactants, texturing agents, such as rubber particles and organophilic clays, light stabilizers, matting agents, photosensitizers, wetting agents, anti-oxidants, plasticizers, opacifiers, stabilizers, degassing agents and mold release agents.

Suitable fillers may include include calcium carbonate, barium sulfate, wollastonite, mica, china clay, diatomaceous earth, benzoic acid, low molecular weight nylon, and combinations comprising at least one of the foregoing fillers. Suitable auxiliary pigments include, for example, titanium dioxide, iron oxide red, iron oxide yellow, phthalocyanine green, phthalocyanine blue, blue tone phthalocyanine green, yellow tone phthalocyanine green, green tone phthalocyanine blue, lamp black, carbon black, and combinations comprising at least one of the foregoing pigments.

Depending upon the desired film opacity and coloration of the resultant coating, the amount of fillers and/or pigments may range from 0 to 120 phr based on the total weight of the coating powder.

Dry flow additives, such as fume silica, fume alumina, fume magnesia and precipitated metal oxides, may be added in the amount of 0.1 phr or more, or 0.2 phr or more, and may be added in higher amounts, for example 5.0 phr or less, or 2.0 phr or less, or 1.0 phr or less, to ease handling and electrostatic application of powders having an average particle size of 20 microns or less.

Matting agents in epoxy and hydroxyl functional polyester powder coating systems may include cyclic amidine and amidine salts, acid anhydride containing materials, such as polystyrene-co-methacrylates (SMA's) or other anhydride adducts of polystyrene and the addition of compounds such as polycarboxylic acid oligomers and polymers, such as acid functional acrylic copolymers. Matting can also be caused by dry blending two powder coatings with different reactivities.

Examples of suitable mold release agents include metallic soaps of fatty acids, such as zinc stearate, copolymers of organophosphate esters, and modified fatty acids, etc. The mold release agents are employed in an amount sufficient to enable release of the cured coating from the mold after the molded article is completed. The release agents are generally employed in the coating powder this invention in a range between about 0.1 and 10 phr, and preferably in a range between about 2 and 5 phr.

Liquid coatings may also be used in the method of the present invention. Such coatings may comprise solventborne coatings. However, these coatings contain undesirable VOCs and are expensive to recycle. These coatings can be thermoplastic, UV or radiation curable or thermosetting and may include acrylic, vinyl, urethane, alkyd, polyester, polyolefin polymers and blends thereof. Thermosetting coatings may suitably comprise curing agents having hydroxyl functionality, such as hydroxyl functional acrylics, polyether or polyester resins, and curing agents having amine functionality, such as aminoplasts, e.g. melamine-formaldehyde resins, urea formaldehyde resin, benzoguanamine resins, and isocyanate and blocked isocyanate curing agents. Hydroxyl functional curing agents may be used to cure urethane resins, alkyds, and acid functional acrylic and polyester resins. Amine functional and isocyanate curing agents may be used to cure hydroxyl functional urethanes, polyesters and acrylics. UV curable coatings may comprise one or more than one acrylic terminated polyester and urethane polymers.

Liquid formulations may contain fillers, catalysts, accelerators and stabilizing agents, including surfactants, commonly used in coating formulations. Further, optional rheological additives, such as associative thickeners, flatteners and fillers can be added to impart required appearance and gloss. Other additives, such as silicone oils, fluorocarbon polymers, polyolefin and PTFE waxes may be added to impart slip, mar resistance and wet out properties. Thickeners and Theological additives may desirably be added to liquid clear coats to prevent pigment "float".

Powder coating compositions may be formulated by dry blending all ingredients together in one or two parts, e.g. in a high speed mixer or blender, extruding each of the one or two parts, one part at a time, at a temperature of from 70 to 160° C., cooling the extrudate, adding any desired dry flow additives, and grinding, with cooling, if desired, and sieving to a desired particle size. Two part powder coating compositions may be formulated by extruding resins or polymers and curing agents or other co-reactive components separately, with each part comprising any desirable additional ingredients. Average particle size desired for electrostatic application ranges from 10 to 60 microns.

Powder coatings may be applied via electrostatic spray guns, fluidized beds, or magnetic brushes. To insure that powder coatings stick to substrates, substrates such as wood or engineered wood (due to moisture), e.g. MDF (medium density fiberboard), metal or glass that are at least partly conductive may be grounded, or, alternatively, dielectric substrates such as plastic, paper or cardboard may be charged or pre-treated to give them a surface charge.

Substrates may be grounded by placing behind the substrate, attaching to the substrate or contacting the substrate with a conductive metal member, such as a hook or metal ribbon, or natural wood member. Further, to insure electrostatic attraction of powder thereto, substrates such as wood or plastic may be pre-treated with aqueous or solvent solutions or dispersions of a charge controlling agent, e.g. aluminum oxide or metal oxides, or metal phosphates, such as alkaline metal or magnesium phosphate. Still further, to insure electrostatic attraction of powder thereto, paper, cardboard or dried wood substrates may be sized with an aqueous cationic polymers or organic sizing agents, such as quaternized ammonium(alk)acrylamide polymers, quaternized N,N-dimethylaminoethyl(meth)acrylate copolymers and terpolymers, aminopolyamide-epichlorohydrin resins, starch, colophony, thermoplastic polyamides and amide waxes, polyalkylene-polyamine-epichlorohydrin resins, poly(diallylamino)-epichlorohydrin resins, ion exchange resins, or quarternary ammonium salts of fats, such as tallow, and hydrophobically modified clays, such as trialkylarylammonium hectorites and smectites, and mixtures thereof. Yet still further, plastic and paper substrates may be pre-treated with aqueous or solvent dispersions or solutions of the aqueous cationic polymers or organic sizing agents, such as having solids contents of 50 wt. % or more. Yet even still further, paper or plastic sheets may be charged for use as substrates by contacting them with a charged metal roller, such as a roller found in an electrophotographic copier or printer.

Powder coatings are heated to form a film and, if desired, cured by passing the substrates between induction coils powered by AC or radio frequency (RF) energy or by passing a mobile or handheld coil unit, such as an RF powered coil unit, around a substrate. The rate of induction heating or cure depends on the magnetic field strength created by AC or by RF, and is proportional to and highly dependent upon the frequency of the magnetic field created by AC or RF and to the amount and type of magnetic material in the powder coating layer. The rate of induction heating is inversely proportional to but is not highly dependent upon the particle size of the magnetic material in the powder coating layer. For example, a 10 μm average particle size filler might cause induction heating at half the speed of the same filler at 0.01 μm average particle size. Less induction heating is required for a given coating if the amount of magnetic material in the powder coating layer is increased, if the average particle size of the magnetic material in the powder coating layer is reduced, if the magnetic material is evenly dispersed into the coating material, if the magnetic material in the powder coating layer has a relatively high Curie temperature, if conductive micron sized particles are included in the coating along with magnetic submicron particles, if the coated substrate is metallic or conductive, or if the frequency of the magnetic field is increased.

Useful induction frequencies may be 50 kHz or more, for example, 100 KHz or more, or 400 KHz or more, and up to 40 MHz, for example up to 10 MHz, or up to 2.5 MHz. In general, a powder coating layer is subject to induction heating and forms a film or cures in a period of from 20 seconds to 20 minutes, preferably from 40 seconds to 8 minutes. Induction curing units may come in a variety of shapes and sizes, such as C-shaped or U-shaped devices arranged so that conveyors run through them; bar, cable or wire heating units which have long cylindrical openings within them of various diameters; solenoids and loops of coil surrounding a flat plate, i.e. a hand-mirror design, for heating surfaces of one or more objects; and, further, coil cabinets, furnaces and planar arrays of coils for generalized heating in the proximity of the coils. For example, a U-shaped unit having a copper winding around a ferromagnetic core fed by AC from an inverter may be used to heat coatings in an alternating elec. field (180 V, 250 kHz). Suitable speeds for conveyor lines running through coil units may range 0.1 meters per minute or more, or 2.0 meters per minute or more, up to 10.0 meters per minute or less, or 8.0 meters per minute or less.

In one embodiment, handheld RF powered, parabolic coil-shaped devices may be held next to substrates coated with magnetic material containing powder coatings or metal parts, or both, and slowly moved along the surfaces of the coated substrates to inductively heat the powder coatings, the metal substrates or both for a sufficient time to flow out a thermoplastic coating or cure a thermosetting coating.

Where additional curing is desired, it may be carried out via UV lamps, such as medium power mercury lamps, or thermal curing for a period of from 2 to 45 minutes, for example from 5 to 20 minutes, at 90° C. or higher, for example, 100° C. or higher, and as high as 250° C. for heat resistant powder coatings, or as high as 200° C. for epoxy and polyester coatings. In the case of UV cure, powder coatings are flowed out for from 1 to 15 minutes under induction coils so that the substrate surface reaches the Tg of the highest Tg resin in the powder coating, but not higher than 110° C.

Cured powder coatings, layers or films may range from 0.75 mil (19.05 μm) to about 6 mil (152.4 μm) thick. A multilayer powder coating having two to three layers may range from 1.5 mil (38.1 μm) to 10 mil (254 μm) thick. Cured liquid coatings, layers or films may range from 0.25 mil (6.35 μm) to about 4 mil (101.6 μm) thick. A multilayer liquid coating having two to four layers may range from 0.75 mil (19.05 μm) to 6 mil (152.4 μm) thick.

Magnetic material-containing powder coated products according to the present invention may include wood products such as furniture, toys and decorative household goods like picture frames, and architectural products like crown molding, and floor and door trim; plastic articles, such as indoor and outdoor furniture and sporting goods, automotive plastic and glass parts, such as glove box doors, headlamps, wheels and hubcaps, tire sidewalls, interior and exterior molding, airbags, interior and exterior use, bumpers, mirror shells, door handles, splash guards, grilles and exterior fascia, and roof and ski racks. Other coated products may include road and highway signs, computers and other electronics devices, such as pagers, cell phones, pdas, stereo equipment, boom boxes, printers and copiers, television and computer monitor cases, toys, books, packaging and print media.

Metal products coated with induction cured powder coatings, with or without magnetic materials in the coatings, include heavy mass parts such as pumps, pipes, gears, steel bars, beams and girders, transformers, air conditioner and appliance casings, motors and rotors, and vehicles, such as tractors, and their corresponding metal parts.

EXAMPLES 1-3

The following examples represent likely uses of the present invention and were not actually performed.

The ingredients are dry mixed in a blender and are fed into a twin-screw extruder operating at 120° C. The extrudate is rolled flat on a chilled plate, broken into chip form and is milled in an impact mill (OMC) to produce a composition having an average particle size of 35 microns. The powder coating composition is spray applied to preheated (90° C. surface temp in a convection oven) flat medium density fiberboard (MDF panels) (20 cm×20 cm) using an ITW Gema corona application gun.

Example 1

Polyester-Primid Powder Coating Composition

| Ingredient | Weight parts |
| --- | --- |
| Carboxy-functional polyester polymer, Acid value 30-38 | 57.000 |
| β-hydroxyalkylamide | 3.000 |
| Benzoin | 0.250 |
| PTFE modified polyethylene wax | 1.000 |
| Flow agent | 1.200 |
| Rutile titanium dioxide | 27.500 |
| $Ni_{0.43}Zn_{0.57}Fe_2$ | 10.050 |

Example 2

Epoxy Polyester Powder Coating Composition

| Ingredient | Weight Parts |
| --- | --- |
| Carboxy-functional polyester polymer, Acid value 45-55 | 35.000 |
| Epoxy resin Bisphenol A Type 3 (DER 663 UE - DOW) | 25.000 |
| Benzoin | 0.250 |
| Polyethylene wax | 1.000 |
| Flow agent | 1.200 |
| Rutile titanium dioxide | 27.500 |
| $Ni_{0.43}Zn_{0.57}Fe_2$ | 10.050 |

Example 3

Epoxy Powder Coating Composition

| Ingredient | Weight Parts |
| --- | --- |
| Epoxy resin Bisphenol A Type 3 (DER 663 UE - DOW) | 58.200 |
| CASAMIDTM 780 β-hydroxyalkylamide (Thomas Swan) | 1.800 |
| Benzoin | 0.250 |
| Polyethylene wax | 1.000 |
| Flow agent | 1.200 |
| Rutile titanium dioxide | 27.500 |
| $Ni_{0.43}Zn_{0.57}Fe_2$ | 10.050 |

After each thermosetting powder coating in Example 1, 2 and 3 is applied, an electromagnetic induction coil is then positioned near the coated surface. The coil is powered with a high-frequency (2.0 Mhz) alternating electric current (AC) to generate an alternating magnetic field in the coil. The interaction between the ferromagnetic material inside the coating and the alternating magnetic field of the induction coil produces heat due to the hysteresis energy loss. Each powder layer is induction heated at from 200° C. to 210° C. for 4 minutes, after which time it is fully cured. During the process, only a small portion of the heat passes to the substrate due to heat diffusion.

The invention claimed is:

1. A powder coating composition comprising one or more than one curable or thermoplastic resin or polymer and one or more than one finely divided magnetic material having a Curie temperature ($T_C$) of from 50° C. to 250° C., wherein the said one or more than one finely divided magnetic material is chosen from $Ni_{1-x}Zn_xFe_2O_4$ compounds, wherein $0.4<X<0.75$, ferrimagnetic $\delta FeOOH$, $Cu_2MnIn$, soft ferrites, Fe—Ni—B, transparent polymer-Cobalt oxide nanocomposites, mixtures thereof; ferromagnetic metals, ferromagnetic alloys, ferromagnetic compounds, ferrimagnetic compounds, and paramagnetic Ni-rich austenite, wherein the ferromagnetic compounds are chosen from $Ni_{1-x}Zn_xFe_2O_4$, $MnO—Fe_2O_3$, $Ni—Zn—Fe_2O_3$ and Ni—Zn alloys having a $T_C$ of less than 250° C.; densified and heat treated ferromagnetic compounds, vitrified compounds from ferromagnetic metals and multilayer particles, and further wherein, when the said one or more than one finely divided magnetic material is chosen from ferromagnetic metals, ferromagnetic alloys, and ferromagnetic compounds, the said composition comprises the said ferromagnetic metals, ferromagnetic alloys, ferromagnetic compounds in the amount of from 0.1 parts per hundred parts resin (phr) to 10 phr.

2. A powder coating composition as claimed in claim 1, wherein the said finely divided magnetic material is chosen from $Ni_{1-x}Zn_xFe_2O_4$ compounds, wherein $0.4<X<0.75$, ferrimagnetic $\delta FeOOH$, $Cu_2MnIn$, soft ferrites, Fe—Ni—B, transparent polymer-Cobalt oxide nanocomposites, mixtures thereof, ferrimagnetic compounds, and paramagnetic Ni-rich austenite and the said composition comprises the said one or more than one finely divided magnetic materia in the amount of from 0.1 parts per hundred parts resin (phr) to 60 phr.

3. A powder coating composition as claimed in claim 1, wherein the said one or more than one finely divided magnetic material is chosen from $Ni_{1-x}Zn_xFe_2O_4$ compounds, wherein $0.4<X<0.75$, ferrimagnetic $\delta FeOOH$, $Cu_2MnIn$, soft ferrites, Fe—Ni—B, transparent polymer-Cobalt oxide nanocomposites, and mixtures thereof.

4. A powder coating composition as claimed in claim 1, wherein the said polymer or resin is chosen from epoxy resins, polyesters, urethanes, acrylics, unsaturated polyesters, silicones, vinyl ether resins, acrylic prepolymers, acrylic resins, and mixtures, hybrids and combinations thereof.

5. A powder coating composition as claimed in claim 1, wherein the said polymer or resin is thermoplastic and is chosen from polyamides, polyolefins, polyvinylidene fluoride (PVDF) resins, polyacetals, ethylene-vinyl acetate copolymers, polystyrenes, polyacrylates, ketone resins, polyvinyl butyrals, mixtures, hybrids and combinations thereof.

6. A powder coating composition as claimed in claim 4, wherein the said polymer or resin is an unsaturated polyester comprising active hydrogens, and the composition further comprises one or more radical polymerizable cross-linker, polymer or prepolymer, one or more thermal initiator, and one or more mold release agent.

7. A powder coating composition as claimed in claim 1, wherein the said one or more than one finely divided magnetic material has an average particle size of from 15 nm to 25 μm.

8. A method of making a powder coating from a powder coating composition as claimed in any one claims 1 to 7 comprising:

applying the said powder coating composition to a substrate to form a powder coating layer; and induction heating the said powder coating layer to melt it to form a coating film and, optionally, to cure the said film.

* * * * *